UNITED STATES PATENT OFFICE.

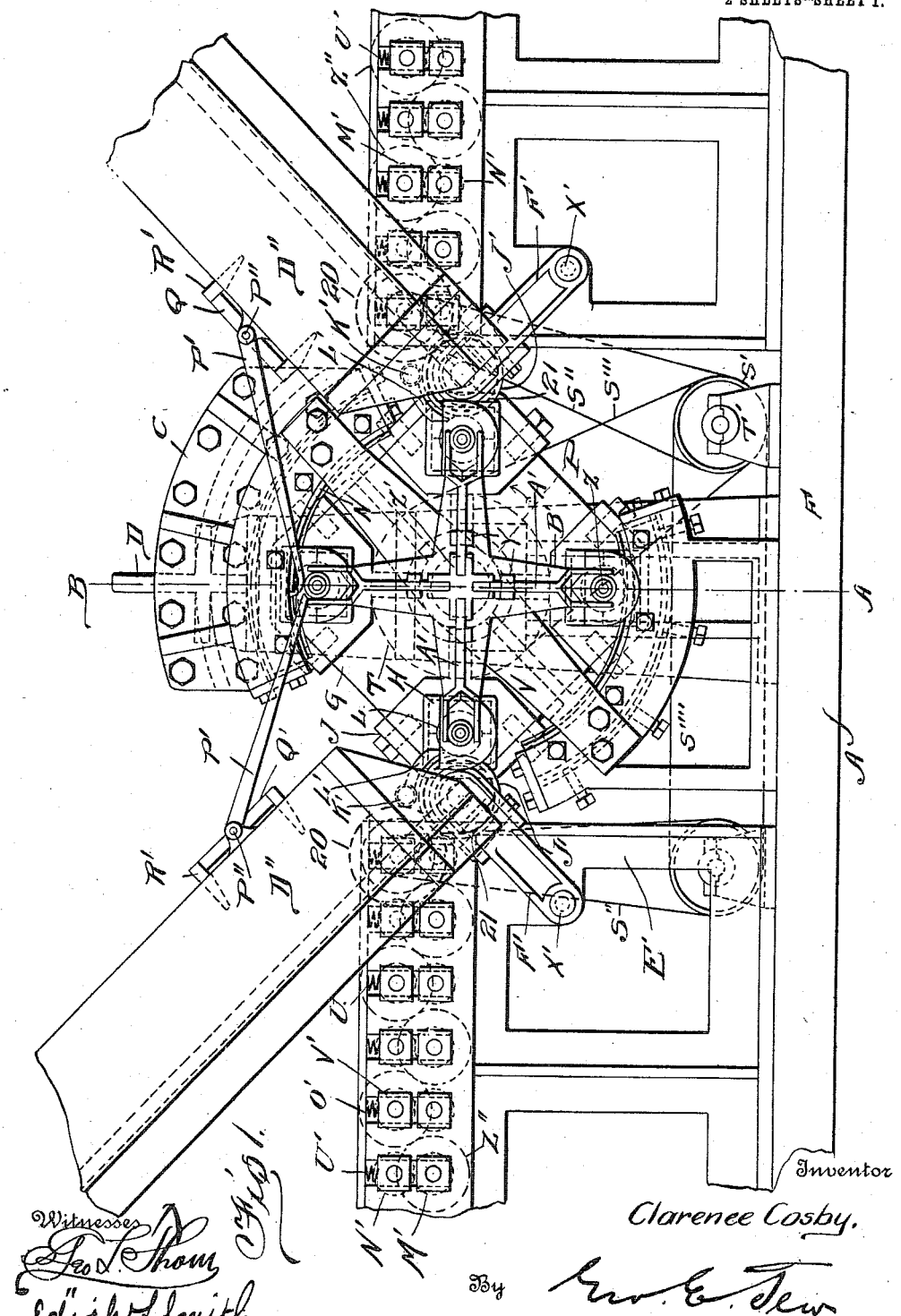

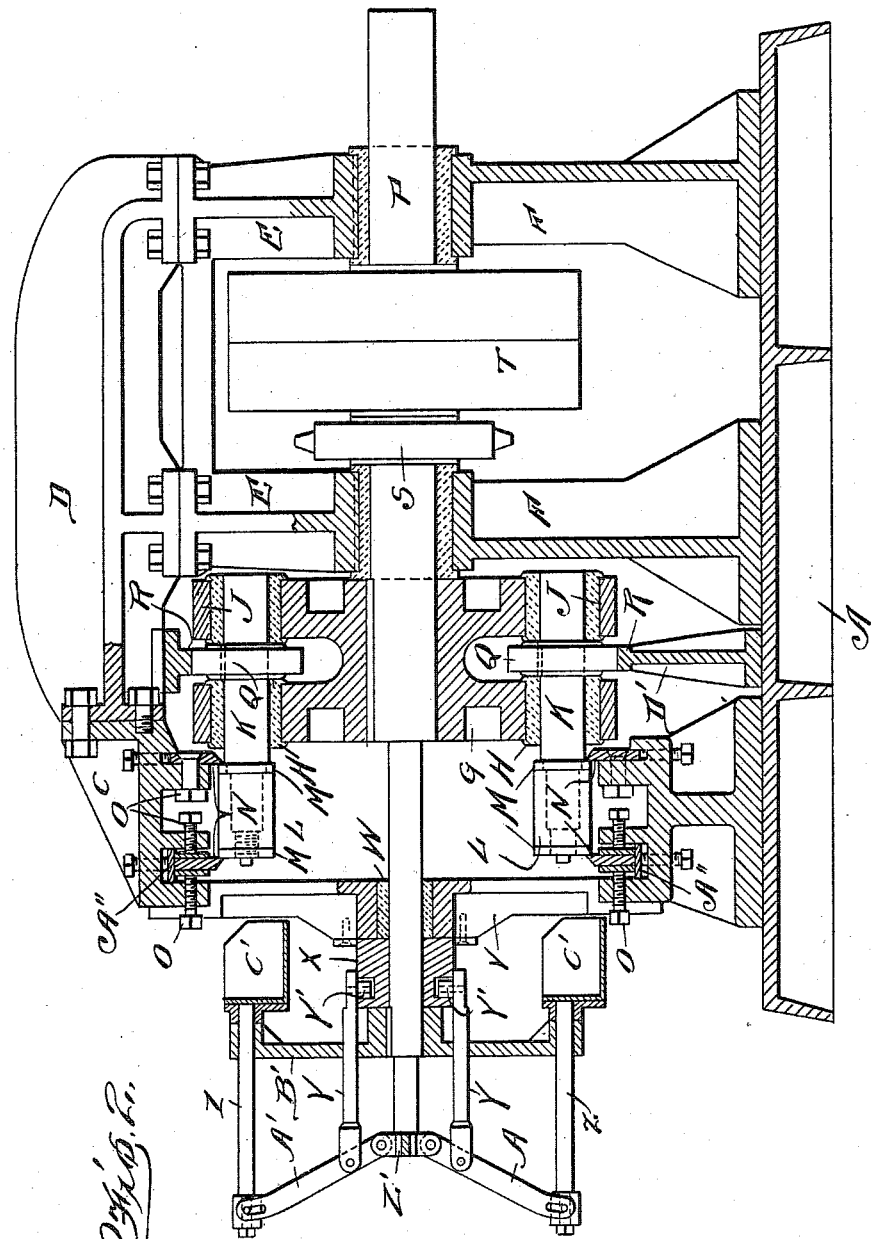

CLARENCE COSBY, OF RICHMOND, VIRGINIA.

CAN-SHEARING MACHINE.

972,828.  Specification of Letters Patent. Patented Oct. 18, 1910.

Application filed October 2, 1909. Serial No. 520,704.

*To all whom it may concern:*

Be it known that I, CLARENCE COSBY, citizen of the United States, residing at Richmond, in the county of Henrico and State of Virginia, have invented certain new and useful Improvements in Can-Shearing Machines, of which the following is a specification.

This invention is a machine for cutting off the heads of old cans, to recover the plates forming the side walls thereof and to prepare the parts of the can for further useful treatment.

The machine embodies means for feeding the cans, for shearing the heads or ends thereof and for flattening and cleaning the sheets after shearing, and comprises a pair of fixed segmental cutters, and revolving mandrels which carry the cans in contact with the cutters, as well as means for automatically feeding the cans to the mandrels, and for stripping or delivering the sheets therefrom after cutting, the parts being so arranged that the operations will be automatically performed, no hand work being required except possibly to supply the cans to the feeding devices. Before being fed to the machine the cans will be slitted lengthwise by means unnecessary to describe here, said slits being provided so that after the heads are sheared off the sheets forming the side walls of the can can be stripped from the mandrels.

The invention is illustrated in the accompanying drawings in which—

Figure 1 is a side elevation of the machine. Fig. 2 is a section on the line A—B of Fig. 1.

Referring specifically to the drawings, A indicates the base of the machine having pedestals F mounted thereon, which support the main shaft P which is provided with a driving pulley T, a sprocket S, and a spider or revolving head G, all fast thereon. The pedestals F have cap bearings E which are extended upwardly to support the cross frame D which carries the upper shear by means of a housing C bolted thereto. This housing is substantially segmental in shape and carries a pair of segmental shear blades or cutters N, by means of set screws O and plates A″. The bolts hold the blades in place, and the outer blade is adjustable laterally by means of the opposite screws O to accommodate variation in the length of the cans. Bolts behind the blades enable them to be set up for wear.

The head or spider G, carried on the shaft P, has bearings H for a set of four mandrels K which are rotatable in said bearings and are also revoluble with the spider, and caps J hold the bearings H in place, said caps being bolted to the spider. The mandrels are located equal distances apart, and the number may be varied if desired. Each mandrel has fast thereon a gear Q arranged to mesh with segmental racks R as the spider revolves, the upper rack being supported by the frame D and the lower rack resting on the base A. The length of these racks is substantially the same as that of the blades N. The lower set of blades is mounted on the frame or casting D, resting on the base A, the blades being held for adjustment by bolts and plates the same as above described. The lower set of blades is located diametrically opposite the upper set, so that each set operates during half a revolution. The mandrels K are provided with fixed circular shear blades M, between which are distance pieces L, and these shear blades coöperate with the blades N to cut through the side walls of the cans near the heads thereof.

The shaft P is reduced at its outer end and is supported by a bearing W in a diagonal brace V bolted at its opposite ends to the housing C and the frame B respectively. The brace V supports a cam X which has a cam groove in its outer surface to receive rollers Y′ connected by rods Y to levers A′. The levers A′ are fulcrumed to the ears of a head Z′ on the outer end of the shaft P, and the outer ends of the levers are connected by slot and pin connections to plungers Z which carry cups C′. The plungers and connecting rods are supported and guided by a spider B′ fast on the shaft P, and the plungers are so positioned that the cups are in line at all times with the mandrels K, and when the main shaft is revolved the plungers and cups work in and out to place the cans on the mandrels. The cups have the general shape of a scoop, open at the top to receive a can, and at the end to transfer the same to the mandrels. The cans are fed to the cups by means of inclined troughs D′ down which the cans roll, being supplied to the troughs in sufficient quantity by any desired means. To automatically feed the cans one by one from each trough to the cups means are provided consisting of a lever P′ with a rock shaft P″ mounted across the chute or trough and carrying an arm Q' with fingers R' at opposite ends depending into the chute and arranged when operated to allow the escape of cans one by one. The free ends of the levers P' extend in position to be struck by the free ends of the arms of the spider B', said ends wiping under the ends of the levers whereby they alternately lift and drop, and at each lift the lower finger R' is raised permitting the first can to drop into the cup then in position to receive it at the end of the chute, the upper finger R' meanwhile checking the succeeding cans.

At each end of the machine is a frame or housing E' located in line with the shears, and supporting a train of rolls M' and brushes N', the shafts of which are carried in slide bearings V', the rolls and brushes being held in contact with each other by springs U' behind the upper bearings. The train of rolls and brushes is driven by means of gears indicated in dotted lines at Z'', and run by a sprocket chain S'' which passes around a sprocket on the shaft N' of the first brush and a sprocket S' the shaft of which is held by a bracket bearing T', said sprocket being driven by sprocket chain S''' driven by the sprocket S on the main shaft. The sprockets S' and chains S'' are duplicated at opposite sides of the machine, the shafts being connected by a chain belt S''''. The housing E' also supports an arm F', fastened thereto by a pivot pin X', and the free end of said arm carries a roller J' and a smaller roller K', as well as a curved stripper L' which is pivotally mounted on the shaft of the roller K'. The arm F' is free to swing to a limited extent so that the roller J' and the end of the stripper L' will come in contact with the can body carried on the projecting end of the mandrel K, or rather on the spacing sleeve L mounted thereon. The roller J' is driven at high speed by a gear 20 on one of the first pair of rolls, meshing with a gear 21 on the stripping roll.

The operation of the machine is as follows: The cans after being slit down the side seams are fed into the chutes from the floor above or some other elevated position and roll down the same until stopped by the fingers R'. The main shaft P and parts carried thereby are driven counter clockwise as indicated by the arrow in Fig. 1. The outer end of one arm of the spider B' strikes and lifts the ends of the levers P', operating the escapement or feed to allow one can to pass into each of the cups C' at that time located adjacent the ends of the respective chutes. The cam X then operates to advance the cups C' inwardly, shoving the cans onto the sleeves L, the transfer being effected during the period the mandrel is traveling from the chute to the beginning of the segmental shear blades. The cans remain supported on the blades M and as the spider G revolves are brought against the shear blades N, at which instant the rotation of the mandrels begins in consequence of the engagement of the gears Q with the racks R, and the revolution and rotation continues, shearing off the ends or heads of the cans which drop off. The sheet forming the body of the can remains on the sleeve L and is brought into contact with the roller J' causing the same to spin or revolve in a direction toward the point of the stripper L' which catches in the slot or slit, made as stated in the can bodies when the side seams are cut out before being fed to this machine, and the plate is stripped off the mandrel and passes between the rollers J' and K' to the series of rollers and brushes between which the plates or sheets pass, cleaning the same of rust and dirt, and the sheets are finally delivered at the ends of the machine in a marketable condition, the sheets being bent to flat shape as they pass between the rollers J' and K'.

What I claim as new is:—

1. In a shearing machine, the combination of a fixed curved blade, a rotatable mandrel provided with a blade and adapted to receive and support a tubular article thereon, and means to revolve the mandrel to bring the article to contact with the fixed blade.

2. In a shearing machine, the combination of fixed segmental blades spaced apart, a rotary mandrel having spaced circular blades thereon arranged to coöperate with said blades, said mandrel being adapted to receive and support a tubular article thereon, and means to revolve the mandrel in proximity to the fixed blades, to shear the article between said fixed and circular blades.

3. In a shearing machine, the combination of a pair of fixed blades spaced apart, a rotary mandrel having a pair of spaced circular blades thereon arranged to coöperate with said fixed blades, said mandrel being adapted to receive and carry a tubular article thereon, and means to move the mandrel along and in proximity to the fixed blades, to open the article.

4. In a shearing machine, the combination of a pair of fixed blades spaced apart, a rotary mandrel having thereon a pair of spaced circular blades to coöperate with said fixed blades, means to move the mandrel along the fixed blades with its axis transverse to said blades, means to feed tubular articles onto the mandrel before said movement, and means to strip the articles from the mandrel after said movement.

5. In a shearing machine, the combination of segmental fixed blades, a shaft, a head thereon, a mandrel mounted for rotation in the head and having circular blades thereon arranged to coöperate with said blades, the mandrel being free at one end to receive tubular articles thereon over said circular blades, means to rotate the shaft, whereby the mandrel is revolved to bring the article in contact with the segmental blades, and means to rotate the mandrel during such contact.

6. In a shearing machine, the combination of a fixed segmental blade, a rotary mandrel revoluble within and adjacent to said blade, a circular blade on the mandrel, arranged to coöperate with said fixed blade while the mandrel is moving along the same, means to automatically feed tubular articles in an endwise direction onto the mandrel while it is revolving, and means to automatically strip the articles from the mandrel tangentially while it is revolving and after it passes the fixed blade.

7. In a shearing machine, the combination of a laterally traveling mandrel means to shear a tubular article thereon, means to automatically feed such article onto the mandrel while it is in motion, and means to automatically deliver the article from the mandrel after being sheared.

8. In a shearing machine, the combination of a revolving and rotating mandrel, means to shear a tubular article thereon during a part of its revolution, means to automatically feed such article onto the mandrel during a prior part of its revolution, and means to deliver the article from the mandrel during a subsequent part of its revolution.

9. In a shearing machine, the combination of a mandrel, means to shear a tubular article thereon, means to feed such articles in succession onto the mandrel, comprising a cup reciprocating in axial alinement with the mandrel, means to operate the cup, and means to deliver the articles from the mandrel after being sheared.

10. In a shearing machine, the combination of a rotary mandrel, means to revolve the same in an annular path, means revoluble with the mandrel to feed tubular articles onto the same, means to shear such article while on the mandrel, and means to deliver the same therefrom after being sheared.

11. In a shearing machine, the combination of a shaft a rotary mandrel carried thereon and revoluble with the shaft around the axis of the latter, means carried by the shaft to feed tubular articles onto the same, means to shear such an article while on the mandrel, and means to strip the article therefrom after it is sheared.

12. In a shearing machine, the combination of a shaft, a rotary mandrel carried thereon and revoluble with the shaft around the axis of the latter, means carried by the shaft to feed tubular articles onto the same including a cup reciprocating in alinement with the axis of the mandrel and toward and from the end thereof, means to shear such article while on the mandrel, and means to deliver the article therefrom after it is sheared.

13. In a shearing machine, the combination of a shaft, a spider thereon, a rotary mandrel mounted in said spider and revoluble therewith around the axis of the shaft, said mandrel having a projecting end provided with circular blades, segmental blades supported in position to coöperate with said blades as the mandrel revolves, and means to rotate the mandrel while said blades are coöperating.

14. In a shearing machine, the combination of a shaft, a spider thereon, a rotary mandrel mounted in said spider and revoluble therewith around the axis of the shaft, said mandrel having a projecting end provided with circular blades, segmental blades supported in position to coöperate with said blades as the mandrel revolves, and means to rotate the mandrel while said blades are coöperating comprising a gear on the mandrel and a segmental rack supported in position to engage said gear while said blades are in coöperation.

15. In a shearing machine, the combination of a frame, a shaft rotatable therein, a rotary mandrel carried by the shaft and eccentric thereto, the axes of the shaft and mandrel being parallel, whereby the mandrel is revolved around the shaft as the latter rotates, means to shear tubular articles on the mandrel during a part of its rotation, and means to automatically feed such articles onto the mandrel including a spider carried by the shaft, a plunger mounted to reciprocate on the spider in axial alinement with the mandrel, said plunger being revoluble with the spider, a cam fixed to the frame, and operative connections between the cam and the plunger constructed to reciprocate the latter as the shaft is rotated, said plunger having a device at the end adjacent the mandrel to receive the articles and deliver the same in succession to the mandrel.

16. The combination of a revolving mandrel adapted to carry tubular articles thereon, means to shear said articles during a part of the revolution of the mandrel, a cup revoluble with the mandrel and movable toward and from the same to place the articles thereon during a part of the revolution of the mandrel, and means to intermittently feed such articles to the cup, including an inclined chute the lower end of which projects adjacent to the path of the cups.

17. The combination of a revolving mandrel, cups revoluble therewith and movable to and from the same in axial alinement to deliver tubular articles onto the mandrel, a revolving support for the cups, and means to deliver such articles into the cups, including an inclined chute the lower end of which extends adjacent to the path of the cups, and an escapement coöperating with the chute and having an operating lever projecting into the path of said support.

18. In a shearing machine, the combination of a revolving mandrel, adapted to carry a longitudinally slitted tubular article thereon, means to shear the ends of the article while it is on the mandrel, and means to strip the article from the mandrel after being sheared, comprising a roller positioned to contact with the article during a part of the revolution of the mandrel, means to drive said roller, and a stripper having a projecting edge and located adjacent to the roller, and arranged to contact said edge with the article and enter the slit thereof, as the article is spun around by the roller.

19. The combination with a shearing machine for tubular articles, of means to deliver said articles from the machine, cleaning rolls and brushes located adjacent to the machine, and means to automatically transfer the articles from said delivering means to said rolls and brushes.

20. In a machine for recovering sheets from old cans, the combination of means for shearing off the ends of the cans, means for automatically feeding the old cans to the shears, means for flattening and cleaning the body sheets of the cans, and means for automatically delivering said sheets from the shears to the cleaning and flattening means.

21. In a shearing machine, the combination of a frame, a shaft therein, opposite pairs of spaced segmental blades mounted in the frame, a spider on the shaft, a series of rotary mandrels mounted in the spider and having ends projecting opposite to said blades, a pair of circular blades on each mandrel, arranged to coöperate with said blades, and means to rotate the mandrels while the blades are in coöperation.

In testimony whereof, I affix my signature in presence of two witnesses.

CLARENCE COSBY.

Witnesses:
M. F. POLLARD,
W. A. CHILDREY.